(12) United States Patent
Wei et al.

(10) Patent No.: US 11,493,809 B2
(45) Date of Patent: Nov. 8, 2022

(54) ELECTRONIC CURTAIN AND ELECTRONIC DEVICE

(71) Applicant: TPK Advanced Solutions Inc., Fujian (CN)

(72) Inventors: Tsai Kuei Wei, Hsinchu County (TW); Chen Hsin Chang, Taoyuan (TW); Ya Wan Chen, Taoyuan (TW); Cai Jin Ye, Xiamen (CN); Tai Shih Cheng, Taipei (TW)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/149,169

(22) Filed: Jan. 14, 2021

(65) Prior Publication Data

US 2022/0221762 A1 Jul. 14, 2022

(51) Int. Cl.
| | |
|---|---|
| *G02F 1/1343* | (2006.01) |
| *G02F 1/1333* | (2006.01) |
| *A47H 99/00* | (2009.01) |
| *G02F 1/1334* | (2006.01) |
| *G06F 3/041* | (2006.01) |
| *A47H 23/08* | (2006.01) |

(52) U.S. Cl.
CPC ....... *G02F 1/134336* (2013.01); *A47H 23/08* (2013.01); *A47H 99/00* (2013.01); *G02F 1/1334* (2013.01); *G02F 1/13338* (2013.01); *G02F 1/13345* (2021.01); *G02F 1/13439* (2013.01); *G06F 3/041* (2013.01)

(58) Field of Classification Search
CPC ........... G02F 1/134336; G02F 1/13345; G02F 1/13338; G02F 1/1334; G02F 1/13439; A47H 23/08; A47H 99/00; G06F 3/041
See application file for complete search history.

(56) References Cited

U.S. PATENT DOCUMENTS

| | | | | |
|---|---|---|---|---|
| 6,166,848 A | * | 12/2000 | Cammenga | .......... B60Q 1/2665 359/267 |
| 10,664,117 B1 | * | 5/2020 | Pai | ......................... G06F 3/0445 |
| 2003/0193709 A1 | * | 10/2003 | Mallya | ................. G02F 1/13718 359/245 |
| 2007/0133078 A1 | * | 6/2007 | Fanton | .............. B32B 17/10174 359/265 |
| 2009/0136688 A1 | * | 5/2009 | Wang | ..................... C09K 19/58 428/1.3 |
| 2012/0139825 A1 | * | 6/2012 | Yashiro | ................. G02F 1/1347 345/105 |
| 2017/0336693 A1 | * | 11/2017 | Stephenson | ............. G02F 1/163 |

FOREIGN PATENT DOCUMENTS

| | | | | | |
|---|---|---|---|---|---|
| CN | 1790118 A | * | 6/2006 | | |
| CN | 108919543 A | | 11/2013 | | |
| CN | 205581464 U | | 9/2016 | | |
| CN | 106997745 A | * | 8/2017 | | .............. G09G 3/32 |
| CN | 104698716 B | | 4/2018 | | |
| JP | 63151931 A | * | 6/1988 | | |
| TW | 201831968 A | | 9/2018 | | |

* cited by examiner

*Primary Examiner* — Hoan C Nguyen
(74) *Attorney, Agent, or Firm* — Cooper Legal Group, LLC

(57) ABSTRACT

An electronic curtain includes a first electrode, a second electrode, and an electrochromic element. At least one of the first electrode or the second electrode includes a plurality of conductive layers stacked and in contact with each other. The electrochromic element is sandwiched between the first electrode and the second electrode.

19 Claims, 5 Drawing Sheets

ELECTRONIC CURTAIN AND ELECTRONIC DEVICE

BACKGROUND

Technical Field

The present disclosure relates to an electronic curtain and an electronic device.

Description of Related Art

With the trend of environmental protection, energy saving, and carbon reduction, the use of smart glass as a substrate or building material has been demonstrated in construction applications, automotive applications (e.g., small area products such as car rearview mirrors), and many commercial applications (such as isolating solar radiation heat sources and ultraviolet rays or controlling electric switches to adjust the amount of light transmission to replace curtains, smart partition screens, building windows, interior decoration, etc.). However, existing smart glass can only be adjusted on or off for the entire surface (e.g. China Patent Application Publication No. 108919543A), and cannot perform partial adjustments to achieve the effect of electronic curtains.

Accordingly, how to provide an electronic device to solve the aforementioned problems becomes an important issue to be solved by those in the industry.

SUMMARY

An aspect of the disclosure is to provide an electronic device that can efficiently solve the aforementioned problems.

According to an embodiment of the disclosure, an electronic curtain includes a first electrode, a second electrode, and an electrochromic element. At least one of the first electrode or the second electrode includes a plurality of conductive layers stacked and in contact with each other. The electrochromic element is sandwiched between the first electrode and the second electrode.

In an embodiment of the disclosure, the conductive layers include a first conductive layer and a second conductive layer. The first conductive layer has a first resistance value. The second conductive layer is stacked and in contact with the first conductive layer, and the second conductive layer has a second resistance value smaller than the first resistance value.

In an embodiment of the disclosure, first conductive layer is a silver nanowire conductive layer, an indium tin oxide (ITO) conductive layer, or an ITO-Al-ITO composite conductive layer.

In an embodiment of the disclosure, the second conductive layer is a metal wire layer.

In an embodiment of the disclosure, metal wires of the metal wire layer cross each other to form a plurality of grids.

In an embodiment of the disclosure, metal wires of the metal wire layer are parallel to each other to form a parallel wire fence.

In an embodiment of the disclosure, the electronic curtain further includes a substrate. The second conductive layer is stacked and in contact between the substrate and the first conductive layer.

In an embodiment of the disclosure, the electrochromic element is a polymer dispersed liquid crystal element or a polymer network liquid crystal element.

In an embodiment of the disclosure, the electrochromic element includes a liquid crystal composite film. A plurality of glass beads are disposed in the liquid crystal composite film.

In an embodiment of the disclosure, the electrochromic element includes an electrochromic material.

According to an embodiment of the disclosure, an electronic device includes the electronic curtain and a touch module. The touch module is disposed at a side of the electronic curtain.

Accordingly, in the electronic device of the present disclosure, by integrating the touch module and the electronic curtain, applications of smart products such as smart buildings, car windows, and transmissive displays can be effectively diversified. In addition, by using a composite conductive layer structure for the electrode of the electronic curtain (for example, including a light-transmitting conductive layer and a metal wire layer), the composite resistance value of the electrode can be greatly reduced, thereby realizing a fast and efficient driving mechanism.

It is to be understood that both the foregoing general description and the following detailed description are by examples and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
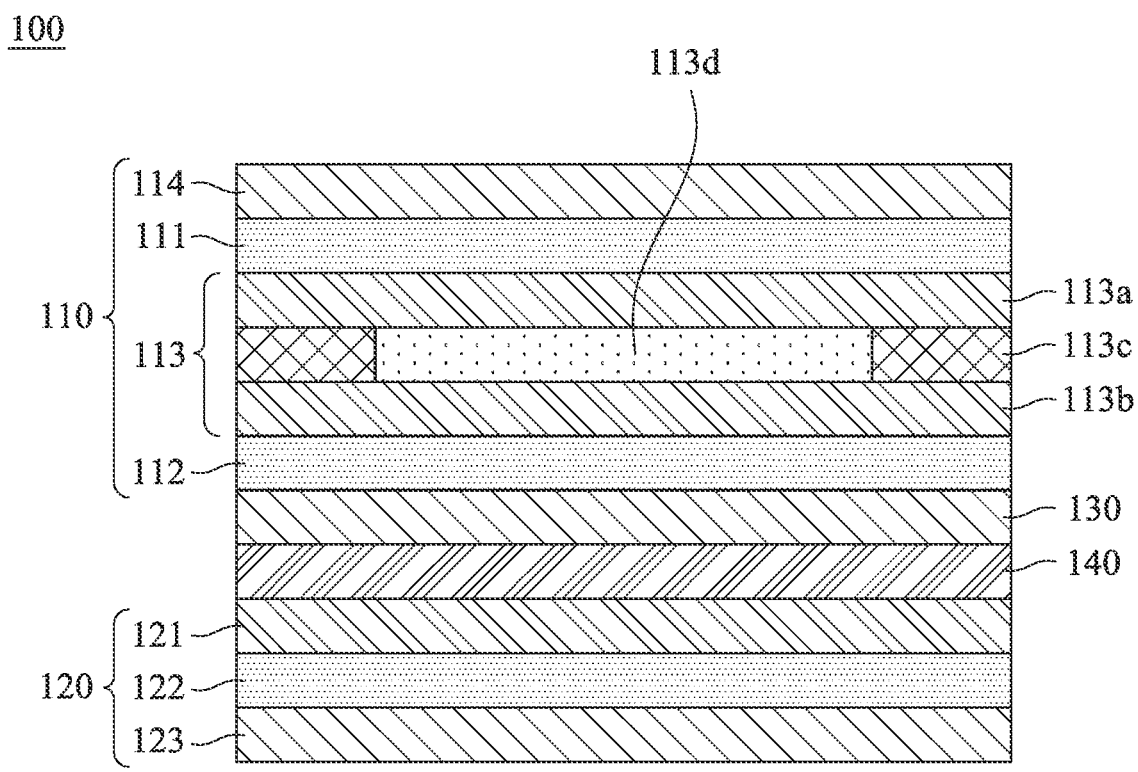
FIG. 1 is a schematic diagram of an electronic device according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram of an electronic device 100 according to an embodiment of the disclosure. As shown in FIG. 1, in the present embodiment, the electronic device 100 includes an electronic curtain 110, a touch module 120, a protective layer 130, and an adhesive 140. The electronic curtain 110 includes a first electrode 111, a second electrode 112, an electrochromic element 113, and a protective layer 114. The electrochromic element 113 is sandwiched between the first electrode 111 and the second electrode 112. The protective layer 114 is disposed at a side of the first electrode 111 away from the electrochromic element 113. The protective layer 130 is disposed at a side of the second electrode 112 away from the electrochromic element 113. The touch module 120 is disposed at a side of the electronic curtain 110. Specifically, the touch module 120 is attached to the protective layer 130 through the adhesive 140. The touch module 120 includes a substrate 121, a touch sensing layer 122, and a protective layer 123. The touch module 120 contacts the adhesive 140 with the substrate 121. The touch sensing layer 122 is disposed at a side of the substrate 121 away from the electronic curtain 110. The protective layer 123 is disposed at a side of the touch sensing layer 122 away from the electronic curtain 110.

In some embodiments, the adhesive 140 is an optical clear adhesive (OCA), but the present disclosure is not limited in this regard.

Figure 2:
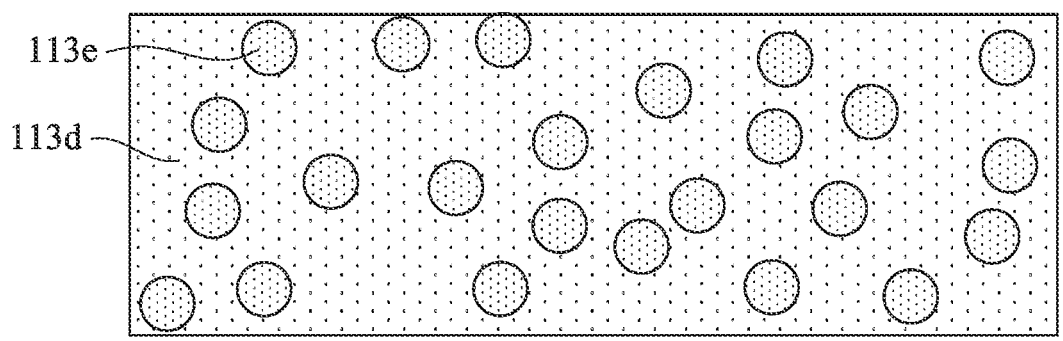
FIG. 2 is a partial schematic diagram of an electrochromic element in FIG. 1.

Reference is made to FIG. 2. FIG. 2 is a partial schematic diagram of the electrochromic element 113 in FIG. 1. As shown in FIGS. 1 and 2, in the present embodiment, the electrochromic element 113 includes substrates 113a, 113b, an edge banding glue 113c, and a liquid crystal composite film 113d. The substrates 113a, 113b respectively contact the first electrode 111 and the second electrode 112. The edge banding glue 113c is sandwiched between the substrates 113a, 113b and forms a closed space with the substrates 113a, 113b. The liquid crystal composite film 113d is accommodated in the closed space. A plurality of glass beads 113e are mixed in the liquid crystal composite film 113d. The glass beads 113e can achieve the structural mechanical support effect and also achieve the effect of preventing the liquid crystal in the liquid crystal composite film 113d from flowing freely.

In some embodiments, the electrochromic element 113 is a polymer dispersed liquid crystal (PDLC) element or a polymer network liquid crystal (PNLC) element. For example, the PDLC element is a composite film with anisotropic liquid crystal droplets uniformly dispersed in a polymer. The refractive index relationship between the liquid crystal and the polymer can be controlled by an external electric field, which can cause light scattering and light transmission, thereby achieving the function film display.

In some embodiments, the liquid crystal in the liquid crystal composite film 113d has positive dielectric anisotropy, and molecular types of the liquid crystal include Nematic, Smetic, ChCLC, Ferroelectric Smetic, Antiferroelectric Smetic, and Guest-Host. When there is no applied voltage, because the effective refractive index $n_{eff}$ of the liquid crystal does not match the refractive index $n_p$ of the polymer, the incident light will pass through many interfaces and be severely scattered, and the liquid crystal composite film 113d will form a scattering state (opaque state, Off State). Once an electric field is generated, the liquid crystal will turn and align perpendicular to the surfaces of the substrates 113a, 113b, so that the refractive index $n_o$ of the liquid crystal is the same as the refractive index $n_p$ of the polymer (equivalent to no interface). Therefore, the vertically incident light can directly transmit through, and the liquid crystal composite film 113d thus forms a transparent state (On State). This display mode is the normal mode of the PDLC element. On the contrary, the liquid crystal composite film 113d of the PDLC element forms a transparent state when no electric field is generated and forms an opaque state after an electric field is generated (that is, when there is a need for privacy, the power can be turned on), so the application rationality can be greatly increased.

In some embodiments, diameters of the glass beads 113e are about 20 μm, but the present disclosure is not limited in this regard.

In some embodiments, the material of at least one of the substrates 113a, 113b, 121 is polyethylene terephthalate (PET) or glass, but the disclosure is not limited in this regard.

Figure 3:
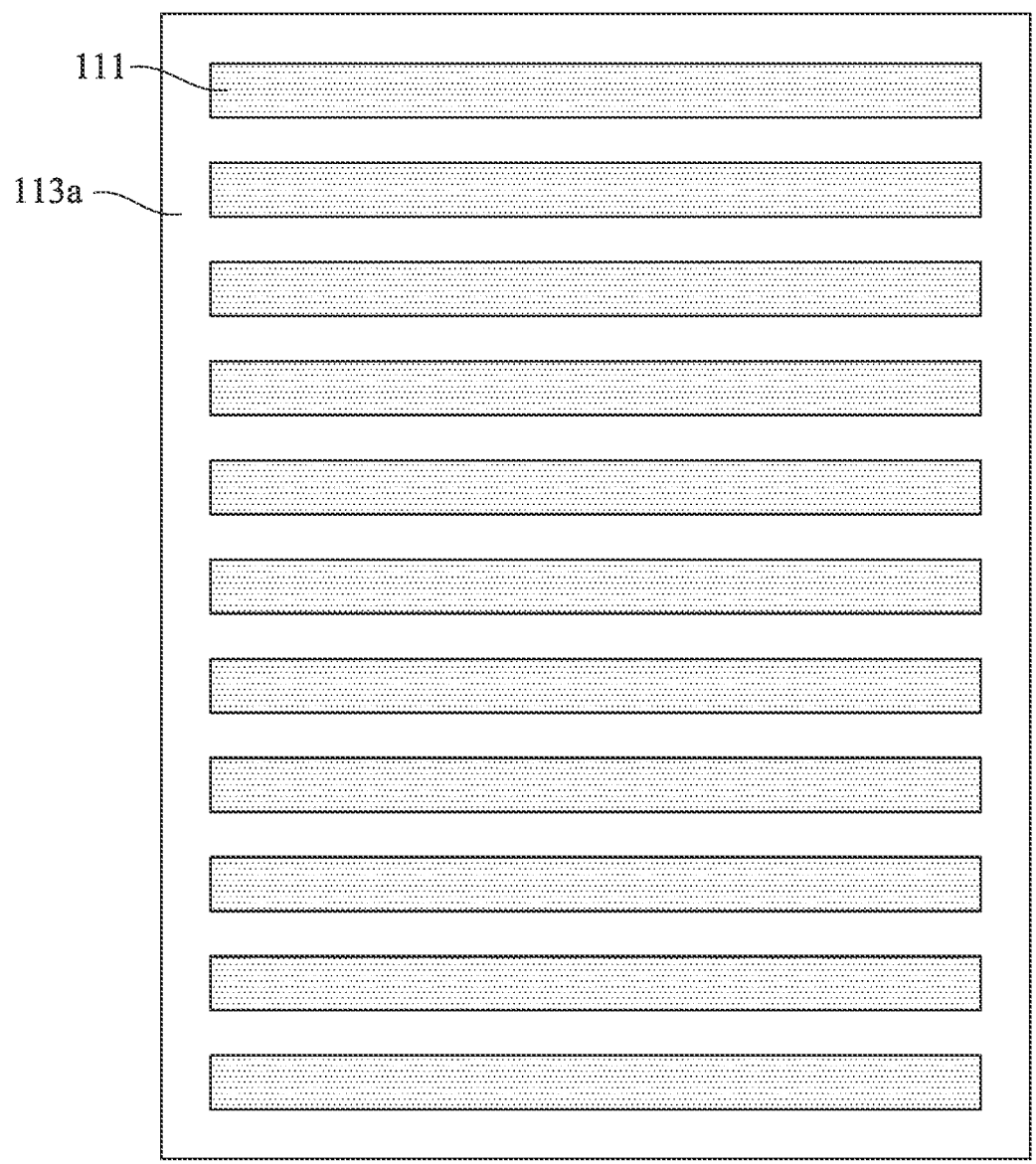
FIG. 3 is a top view of certain components of the electronic device in FIG. 1.

Reference is made to FIG. 3. FIG. 3 is a top view of certain components of the electronic device 100 in FIG. 1. As shown in FIG. 3, in the present embodiment, the first electrode 111 includes a plurality of separate electrode blocks disposed on the substrate 113a. These electrode blocks extend in one direction (e.g., the horizontal direction in FIG. 3) and are arranged at intervals in another direction (e.g., the longitudinal direction in FIG. 3). In contrast, the second electrode 112 may also include a plurality of separate electrode blocks (not shown) disposed on the substrate 113b. The shape, size, and arrangement of the electrode blocks on the second electrode 112 are the same or similar to those of the electrode blocks on the first electrode 111 (e.g., the electrode blocks on the second electrode 112 extend in a same direction as the electrode blocks on the first electrode 111), and the electrode blocks of the first electrode 111 and the second electrode 112 respectively correspond in the stacking direction of the first electrode 111 and the second electrode 112 (that is, projections of the electrode blocks of the first electrode 111 and the second electrode 112 respectively overlap in the stacking direction).

In some embodiments, the electronic device 100 may further include a controller (not shown). The controller is configured to independently control any of the electrode blocks of the first electrode 111 and/or the second electrode 112 to locally generate an electric field, so that the transparent state/opaque state of the local area of the electrochromic element 113 can be controlled. As such, in practical applications, when the touch module 120 detects a touch input, the controller may be further configured to control the electrode blocks of the first electrode 111 and/or the second electrode 112 corresponding to the touch position to locally generate an electric field.

Figure 4:
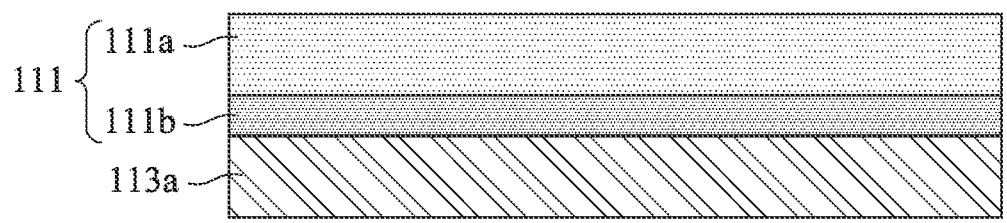
FIG. 4 is a cross-sectional view of the components in FIG. 3.

Reference is made to FIG. 4. FIG. 4 is a cross-sectional view of the components in FIG. 3. As shown in FIG. 4, in the present embodiment, the first electrode 111 includes a first conductive layer 111a and a second conductive layer 111b. The first conductive layer 111a has a first resistance value. The second conductive layer 111b is stacked and in contact between the first conductive layer 111a and the substrate 113a, and the second conductive layer 111b has a second resistance value smaller than the first resistance value.

In some embodiments, the first conductive layer 111a is a silver nanowire (SNW; also known as AgNW) electrode layer. In detail, the first conductive layer 111a includes a substrate and silver nanowires doped therein. The silver nanowires overlap each other in the substrate to form a conductive network. The substrate refers to the non-nanosilver material formed by the solution including the silver nanowires through processes such as coating, heating, and drying. The silver nanowires are distributed or embedded in the substrate and partially protrude out from the substrate. The substrate can protect the silver nanowires from the external environment, such as from corrosion and abrasion. In some embodiments, the substrate is compressible.

In some embodiments, a wire length of the silver nanowires ranges from about 10 μm to about 300 μm. In some embodiments, a wire diameter (or a wire width) of the silver nanowires is less than about 500 nm. In some embodiments, an aspect ratio of the silver nanowires (the ratio of the wire length to the wire diameter) is greater than 10. In some embodiments, the silver nanowires can be deformed forms such as other conductive metal nanowires or non-conductive nanowires coated with silver. The use of the silver nanowires to form the silver nanowire electrode layers has the following advantages compared with ITO: low price, simple process, good flexibility, resistance to bending, etc.

In some embodiments, the first conductive layer 111a is an indium tin oxide (ITO) electrode layer or an ITO-Al-ITO composite conductive layer.

In some embodiments, the second conductive layer 111b is a metal wire layer (such as a metal grid or a metal barrier). Therefore, the composite resistance value of the first electrode 111 can be greatly reduced due to the recombination of the second conductive layer 111b, thereby realizing a fast and efficient driving mechanism. In addition, as shown in FIG. 4, by disposing the second conductive layer 111b between the first conductive layer 111a and the substrate 113a, the protective layer 114 can be disposed on the flat surface provided by the first conductive layer 111a.

Specifically, the composite resistance value can be calculated by the following formula (1):

$$RC=R1*R2/(R1+R2) \quad (1)$$

Where RC is the composite resistance value, R1 is the first resistance value of the first conductive layer 111a, and R2 is the second resistance value of the second conductive layer 111b.

In some embodiments, the second electrode 112 may alternatively or simultaneously have the structural configuration of the first electrode 111 described above, which will not be repeated here. In some embodiments, the second electrode 112 and the protective layer 130 may alternatively or simultaneously have the connection relationship between the first electrode 111 and the protective layer 114 described above, which will not be repeated here.

Figure 5:
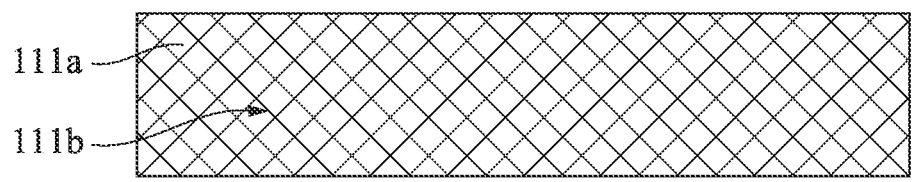
FIG. 5 is a schematic diagram of a first electrode according to an embodiment of the disclosure.

Reference is made to FIG. 5. FIG. 5 is a schematic diagram of the first electrode 111 according to an embodiment of the disclosure. As shown in FIG. 5, in the present embodiment, metal wires of the metal wire layer (i.e., the second conductive layer 111b) of the first electrode 111 cross each other to form a plurality of grids. Specifically, as shown in FIG. 5, the metal wire layer includes a plurality of metal wires extending in one direction (e.g., the direction from upper left to lower right) and a plurality of metal wires extending in another direction (e.g., the direction from upper right to lower left), but the present disclosure is not limited in this regard.

Figure 6:
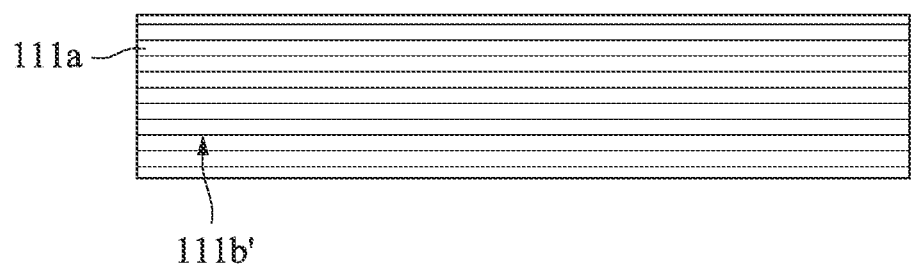
FIG. 6 is a schematic diagram of a first electrode according to another embodiment of the disclosure.

Reference is made to FIG. 6. FIG. 6 is a schematic diagram of a first electrode 111' according to another embodiment of the disclosure. As shown in FIG. 6, in the present embodiment, metal wires of the metal wire layer (i.e., a second conductive layer 111b') of the first electrode 111' are parallel to each other to form a parallel wire fence.

In some embodiments, a wire width of the metal wires of the aforementioned metal wire layer is about 3 μm to about 10 μm, preferably less than about 5 μm. In some embodiments, the proportion of the aforementioned metal wire layer with respect to the area on the first conductive layer 111a is less than about 5%, so light transmittance of at least 95% is maintained.

In some embodiments, the electronic device 100 may also include a transmissive display (not shown) disposed above the electronic curtain 110 to effectively diversify the applicability of smart products.

Figure 7:
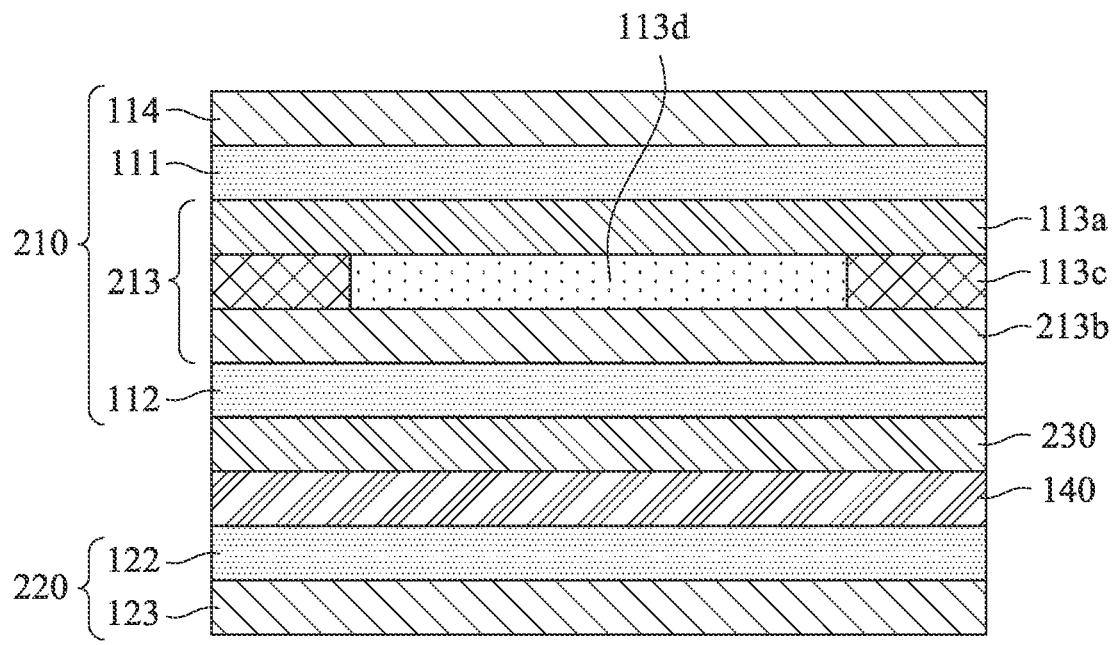
FIG. 7 is a schematic diagram of an electronic device according to another embodiment of the disclosure.

Reference is made to FIG. 7. FIG. 7 is a schematic diagram of an electronic device 200 according to another embodiment of the disclosure. As shown in FIG. 7, in the present embodiment, the electronic device 200 includes an electronic curtain 210, a touch module 220, a substrate 230, and an adhesive 140. The electronic curtain 210 includes a first electrode 111, a second electrode 112, an electrochromic element 213, and a protective layer 114. The electrochromic element 213 is sandwiched between the first electrode 111 and the second electrode 112. The protective layer 114 is disposed at a side of the first electrode 111 away from the electrochromic element 213. The touch module 220 is disposed at a side of the electronic curtain 210. Specifically, the touch module 220 is attached to the substrate 230 through the adhesive 140. The touch module 220 includes a touch sensing layer 122 and a protective layer 123. The touch module 220 contacts the adhesive 140 with the touch sensing layer 122. The protective layer 123 is disposed at a side of the touch sensing layer 122 away from the electronic curtain 210. The electrochromic element 213 includes a substrate 113a, a protective layer 213b, an edge banding glue 113c, and a liquid crystal composite film 113d. The substrates 113a and the protective layer 213b respectively contact the first electrode 111 and the second electrode 112. The edge banding glue 113c is sandwiched between the substrate 113a and the protective layer 213b and forms a closed space with the substrate 113a and the protective layer 213b. The liquid crystal composite film 113d is accommodated in the closed space. In the present embodiment, components with the same reference numbers as those in the embodiment shown in FIG. 1 are the same or similar. Therefore, the foregoing can be referred to for the description of these components, and the description will not be repeated here.

It should be noted that in the manufacturing process of the electronic device 100 shown in FIG. 1, the electronic curtain 110 and the touch module 120 are manufactured separately, and then the adhesive 140 is used for bonding. In contrast, in the manufacturing process of the electronic device 200 shown in FIG. 7, the touch module 220 is directly attached to the substrate 230 on which the electronic curtain 210 is manufactured.

Figure 8:
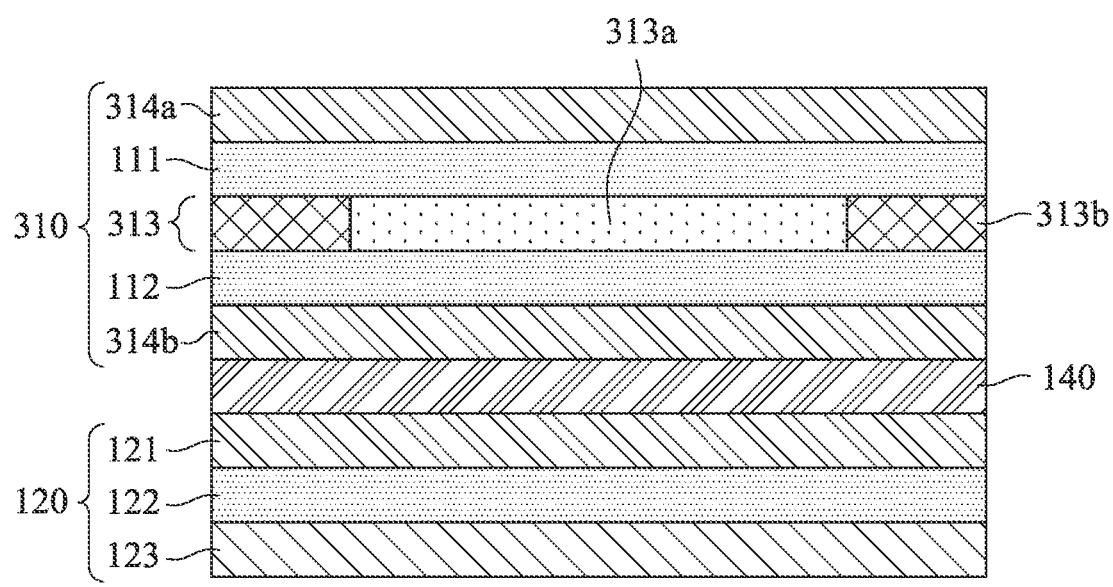
FIG. 8 is a schematic diagram of an electronic device according to another embodiment of the disclosure.

Reference is made to FIG. 8. FIG. 8 is a schematic diagram of an electronic device 300 according to another embodiment of the disclosure. As shown in FIG. 8, in the present embodiment, the electronic device 300 includes an electronic curtain 310, a touch module 120, and an adhesive 140. The electronic curtain 310 includes a first electrode 111, a second electrode 112, an electrochromic element 313, and substrates 314a, 314b. The electrochromic element 313 is sandwiched between the first electrode 111 and the second electrode 112. The substrate 314a is disposed at a side of the first electrode 111 away from the electrochromic element 313. The substrate 314b is disposed at a side of the second electrode 112 away from the electrochromic element 313. The touch module 120 is disposed at a side of the electronic curtain 310. Specifically, the touch module 120 is attached to the substrate 314b through the adhesive 140. The electrochromic element 313 includes an edge banding glue 313b and an electrochromic material 313a. The edge banding glue 313b is sandwiched between the first electrode 111 and the second electrode 112 and forms a closed space with the first electrode 111 and the second electrode 112. The electrochromic material 313a is accommodated in the closed space. In the present embodiment, components with the same reference numbers as those in the embodiment shown in FIG. 1 are the same or similar. Therefore, the foregoing can be referred to for the description of these components, and the description will not be repeated here.

It should be noted that the electrochromic material 313a is electroactive and configured to undergo an oxidation-reduction reaction under the action of the electric field generated between the first electrode 111 and the second electrode 112 to gain or lose electrons, so that the energy level of the material changes and the color changes. In practical applications, the electrochromic element 313 may further include other materials. The materials are used to store the corresponding counter ions when the electrochromic material 313a undergoes a redox reaction, so as to maintain the overall charge balance.

In some embodiments, the material of at least one of the substrates 314a, 314b is polyethylene terephthalate (PET) or glass, but the present disclosure is not limited in this regard.

In some embodiments, the electrochromic material 313a can be filled with a UV-curable substance to make the electrochromic material 313a bendable, such that the electronic device 300 can be used for flexible applications.

Figure 9:
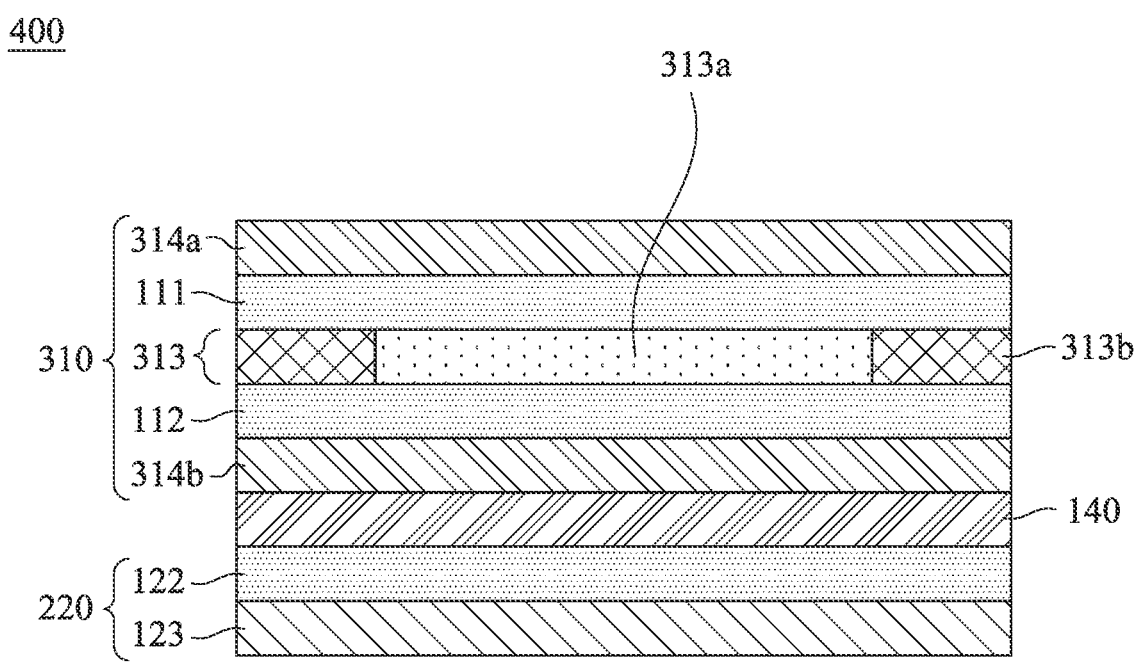
FIG. 9 is a schematic diagram of an electronic device according to another embodiment of the disclosure.

Reference is made to FIG. 9. FIG. 9 is a schematic diagram of an electronic device 400 according to another embodiment of the disclosure. As shown in FIG. 9, in the present embodiment, the electronic device 400 includes an electronic curtain 310, a touch module 220, and an adhesive 140. The touch module 220 is disposed at a side of the electronic curtain 310. Specifically, the touch module 220 is attached to the substrate 314b through the adhesive 140. The touch module 220 includes a touch sensing layer 122 and a protective layer 123. The touch module 220 contacts the adhesive 140 with the touch sensing layer 122. The protective layer 123 is disposed at a side of the touch sensing layer 122 away from the electronic curtain 310. In the present embodiment, components with the same reference numbers as those in the embodiment shown in FIG. 8 are the same or similar. Therefore, the foregoing can be referred to for the description of these components, and the description will not be repeated here.

It should be noted that in the manufacturing process of the electronic device 300 shown in FIG. 8, the electronic curtain 310 and the touch module 120 are manufactured separately, and then the adhesive 140 is used for bonding. In contrast, in the manufacturing process of the electronic device 400 shown in FIG. 9, the touch module 220 is directly attached to the substrate 314b on which the electronic curtain 310 is manufactured.

According to the foregoing recitations of the embodiments of the disclosure, it can be seen that in the electronic device of the present disclosure, by integrating the touch module and the electronic curtain, applications of smart products such as smart buildings, car windows, and transmissive displays can be effectively diversified. In addition, by using a composite conductive layer structure for the electrode of the electronic curtain (for example, including a light-transmitting conductive layer and a metal wire layer), the composite resistance value of the electrode can be greatly reduced, thereby realizing a fast and efficient driving mechanism.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device, comprising:
an electronic curtain comprising:
a first electrode;
a second electrode, wherein:
at least one of the first electrode or the second electrode comprises a plurality of conductive layers stacked and in contact with each other,
the conductive layers comprise:
a first conductive layer having a first resistance value; and
a second conductive layer stacked and in contact with the first conductive layer, the second conductive layer having a second resistance value smaller than the first resistance value,
the second conductive layer is a metal wire layer,
metal wires of the metal wire layer cross each other to form a plurality of grids,
a wire width of the metal wires of the metal wire layer is 3 µm to 10 µm,
a proportion of an area occupied by the metal wire layer with respect to an area of the first conductive layer is less than 5% so light transmittance of at least 95% is maintained, and
the at least one of the first electrode or the second electrode comprises a first plurality of electrode blocks configured to be independently controlled; and
an electrochromic element sandwiched between the first electrode and the second electrode, wherein the electrochromic element comprises an electrochromic material; and
a touch module disposed at a side of the electronic curtain, wherein:
the touch module comprises a touch sensing layer, and
a substrate is disposed between the touch sensing layer and the electronic curtain.

2. The electronic device of claim 1, wherein the first conductive layer is a silver nanowire conductive layer, an indium tin oxide (ITO) conductive layer, or an ITO-Al-ITO composite conductive layer.

3. The electronic device of claim 1, wherein the electronic curtain further comprises a second substrate, wherein the second conductive layer is stacked and in contact between the second substrate and the first conductive layer.

4. The electronic device of claim 1, wherein:
the first electrode comprises the first plurality of electrode blocks arranged in parallel and configured to be independently controlled, and
the second electrode comprises a second plurality of electrode blocks arranged in parallel and configured to be independently controlled.

5. The electronic device of claim 4, wherein a longest dimension of the first plurality of electrode blocks and a longest dimension of the second plurality of electrode blocks extend in a same direction.

6. The electronic device of claim 5, wherein projections of the first plurality of electrode blocks and the second plurality of electrode blocks respectively overlap.

7. The electronic device of claim 1, wherein each of the first electrode and the second electrode comprises the plurality of conductive layers stacked and in contact with each other.

8. The electronic device of claim 1, wherein the second conductive layer is between the first conductive layer and the electrochromic element.

9. The electronic device of claim 1, further comprising a protective layer, wherein the first conductive layer is between the protective layer and the second conductive layer.

10. An electronic curtain, comprising:
a first electrode;
a second electrode, wherein:
at least one of the first electrode or the second electrode comprises a plurality of conductive layers stacked and in contact with each other,
the conductive layers comprise:
a first conductive layer having a first resistance value; and
a second conductive layer stacked and in direct contact with the first conductive layer, the second conductive layer having a second resistance value smaller than the first resistance value,
the second conductive layer is a metal wire layer,
metal wires of the metal wire layer cross each other to form a plurality of grids,
a wire width of the metal wires of the metal wire layer is 3 μm to 10 μm,
a proportion of an area occupied by the metal wire layer with respect to an area of the first conductive layer is less than 5% so light transmittance of at least 95% is maintained; and
an electrochromic element sandwiched between the first electrode and the second electrode, wherein electrochromic element comprises an electrochromic material.

11. The electronic curtain of claim 10, wherein the at least one of the first electrode or the second electrode comprises a first plurality of electrode blocks configured to be independently controlled.

12. The electronic curtain of claim 10, wherein the first conductive layer is a silver nanowire conductive layer, an indium tin oxide (ITO) conductive layer, or an ITO-Al-ITO composite conductive layer.

13. The electronic curtain of claim 10, further comprising a substrate, wherein the second conductive layer is stacked and in contact between the substrate and the first conductive layer.

14. The electronic curtain of claim 11, wherein:
the first electrode comprises the first plurality of electrode blocks configured to be independently controlled, and
the second electrode comprises a second plurality of electrode blocks configured to be independently controlled.

15. The electronic curtain of claim 11, wherein a longest dimension of the first plurality of electrode blocks and a longest dimension of the second plurality of electrode blocks extend in a same direction.

16. The electronic curtain of claim 11, wherein projections of the first plurality of electrode blocks and the second plurality of electrode blocks respectively overlap.

17. The electronic curtain of claim 10, wherein each of the first electrode and the second electrode comprises the plurality of conductive layers stacked and in contact with each other.

18. The electronic curtain of claim 10, wherein the second conductive layer is between the first conductive layer and the electrochromic element.

19. The electronic curtain of claim 10, further comprising a protective layer, wherein the first conductive layer is between the protective layer and the second conductive layer.

* * * * *